UNITED STATES PATENT OFFICE 2,109,871

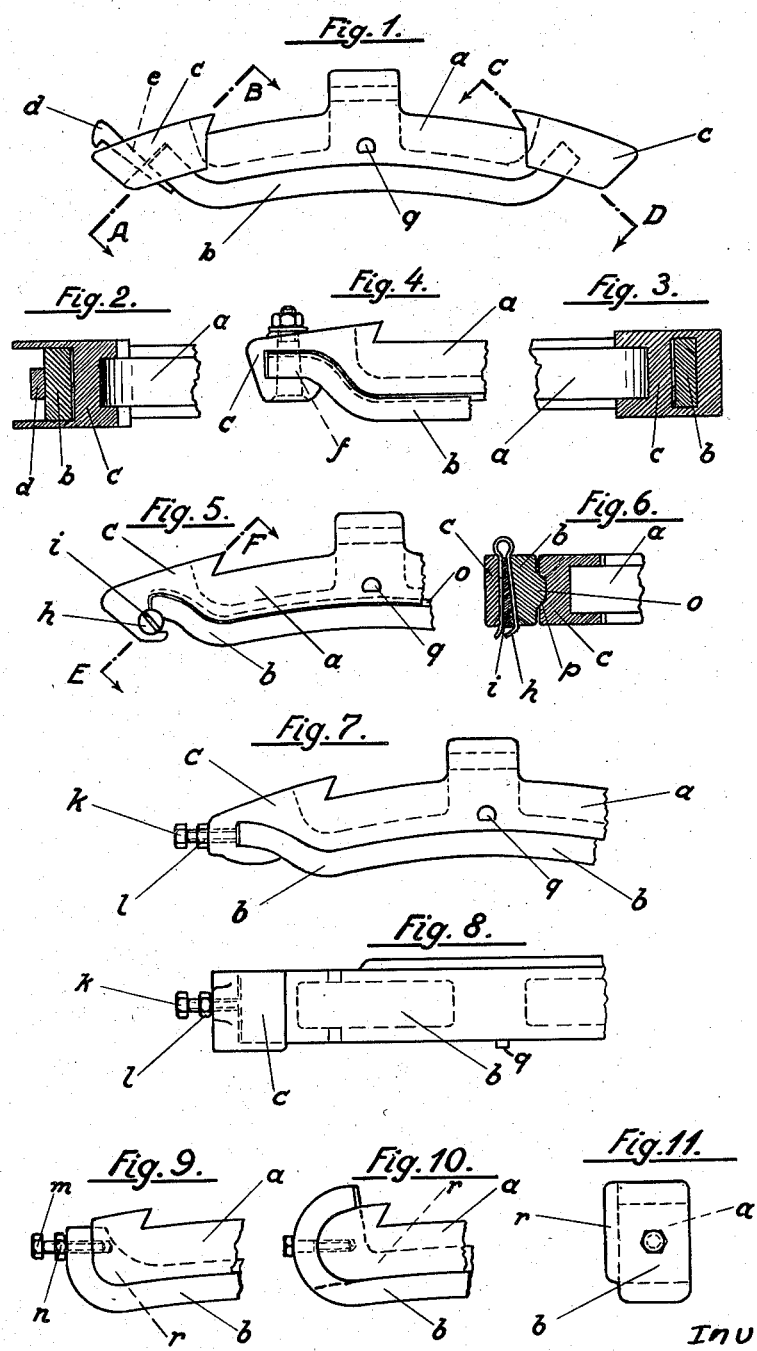

BRAKE BLOCK WITH INTERCHANGEABLE BRAKE SURFACE

Albert Thode, Hamburg, Germany

Application December 28, 1935, Serial No. 56,479
In Germany January 3, 1935

7 Claims. (Cl. 188—234)

This invention relates to vehicle brake devices having interchangeable surface members, and has particular reference to brake blocks for railway vehicles.

The main object of the present invention is to provide an improved construction of brake facing which is easy to manufacture, simple and efficient in operation and for assembly, and particularly adapted to be expeditiously replaced, as when nearly worn out. Heretofore replaceable facings composed of non-metallic strip material, and consisting, for example, of treated asbestos have been used, in connection with brake structures.

It has also been proposed to provide metallic facing members for brake devices, some of which have been uniform in cross section in some parts of their length; and these members have been formed by methods other than bending. Such members have been formed as by forging or casting, with individual parts, such as ends, where flanges or lugs are used for locating the facings upon the holders, of greater thickness than other parts of the facings in the length thereof.

The precise fitting of brake shoes, as heretofore known, renders replacement inconvenient and expensive, and brake devices with interchangeable brake shoes have not succeeded in replacing unitary brake blocks, because they exhibit a number of disadvantages.

The replacement or removal and attachment of brake surfaces is very inconvenient and time wasting when, for this purpose, vehicles are withdrawn from service and taken to the workshops. Moreover, many known interchangeable brake surfaces have been so arranged that only small amounts thereof, say about one half, can be used for wear purposes. In addition, they have the disadvantage that they must be specially worked and fitted to the fastening places on the holders.

In a brake block adapted particularly for railway vehicles comprising a holder carrying a detachable friction facing of metal, the present invention is characterized by having the facing in the form of a rigid strip wherein the cross sectional dimensions are uniform throughout, the ends of the strip being bent back and engaged against the holder so as to coact therewith in holding the strip and in transmitting the whole of the braking force from the strip to the holder.

Preferably, as in certain aspects of the invention, the bent ends of the facing are received within pockets formed in the end portions of the holder, and, as where the brake block is intended for use with flanged wheels, an index device may be provided on the holder for showing the extent to which the facing becomes worn, the distance between said device and facing being visible.

In order to eliminate the disadvantage incident to the requirement in previous devices that the ends of the brake shoe or wearing strip must be worked in some manner as by machining or bending it is to be noted that in the manufacture of brakes, especially such as are here used in connection with railroads, the body or brake head is generally an iron or steel casting and is not machined in any way. Further, in the manufacture of facing strips or brake shoes such as are contemplated in this invention the procurement of a strip of uniform cross-section throughout is easily attainable by the ordinary rolling process. When the cast brake bodies or heads are provided with pockets to receive bent ends of such a rolled strip there will necessarily be a certain amount of clearance or play between the strip ends and the cast pockets or slots since otherwise the fitting of these parts together would require machining or other working which it is an especial object of this invention to avoid. It is, therefore, to be noted, as hereinafter explained, that in the present invention the fit of the brake shoe ends into the pockets or slots formed in the brake heads is that which would ordinarily occur between a rolled member and a cast member or in other words the fit would be slightly loose.

Certain embodiments of the invention are shown by way of example in diagrammatic representation in the accompanying drawing.

Fig. 1 shows a brake block with removable brake surface in side view;

Figs. 2 and 3 show sections along the line A—B and C—D of Fig. 1;

Figs. 4 and 5 show parts of two further embodiments in side view;

Fig. 6 shows a section along the line E—F of Fig. 5;

Figs. 7 and 8 show in side view and in plan a part of a brake block with a different means for locking the brake surface in the holder;

Fig. 9 shows a part of another embodiment in side view;

Fig. 10 shows a side view and Fig. 11 an end view of another mode of fastening the brake surface to the holder.

The character $a$ denotes the holder, and $b$ is a rigid detachable brake strip of uniform cross sectional dimensions throughout its length. This strip, provided with a concave friction face, as shown, has its ends bent back from the line of curvature of said face, and the rear face of said strip, including its ends, leans against or engages the front face of said holder. In the example according to Figs. 1–3 the strip b is bent back at about 45° from the braking surface, while in the embodiments according to Figs. 4 to 8 the brake surface b is cranked or bent outwardly at the ends in such manner that the ends are considerably stepped back from and extend approximately parallel to the braking face. In the examples according to Figs. 9 to 11, the brake surface is bent back in one case approximately at right-angles to the braking face, this being at the ends, which embrace the ends of the holder, only one end of the device being shown; and in the other case it extends about the ends of the holder a along an arc, also as shown. In the embodiments according to Figs. 1 to 8 the holder is provided at the ends with pockets c to receive the ends of the brake surface b. According to Figs. 1 to 3 one of these pockets c, namely the left hand pocket, being the upper pocket in the working position, is made open on the side facing the braking face. In place of the omitted wall of the pocket a removable abutment in the form of a wedge d is provided, which is guided in a channel e in the holder a to constitute a flat wedge d parallel to the ends of the brake surface b. In the embodiment according to Figs. 4 to 8 the pockets c are made open on one or both sides. According to Fig. 4 the brake strip b is prevented from slipping out of the pocket c laterally by a wedge pin f passing through the walls of the pocket c and the end of the strip b. In the embodiment according to Fig. 5 the locking is effected by a pin h with interposed wedge i, as indicated in Fig. 6, which pin and wedge fill the gap between the brake strip b and the wall of the pocket c of the holder a.

In the construction according to Figs. 7 and 8, a retaining screw k, with a lock unit l, is provided in the wall of the pocket c, and this screw, tightly engaging the end of the rigid strip b, prevents said strip from inadvertently slipping out of the pocket, when the block is out of the working position. The end engagement of the screw tends to urge the opposite end of the strip into a like pocket, not shown, at the opposite end of the device.

In the embodiment according to Fig. 9 the brake surface b is secured in position on the holder a, when the brake block is out of the working position, by means of a screw element m, with a lock nut n, said element being screwed through the brake surface into said holder, the latter being conveniently hollow, as indicated in broken lines, between the end portions and the outer, central apertured attaching lug, as shown. See Figs. 1–7, for example.

In the embodiments according to Figs. 10, 11, already referred to in part, where the end structure is of arcuate formation, the end of the strip b may be secured to the holder, when the block is not in the working position, by a screw, as shown, like the screw m of Fig. 9. The brake surface b may in addition be provided with a rib o, Fig. 6, in the longitudinal direction which fits into a corresponding longitudinal recess p in the holder a and prevents a lateral sliding of the brake surface b on the holder a. Instead of a central web o as indicated in Fig. 6, the brake surface b may have one or two lateral webs r which embrace the holder a laterally.

The brake surface b is preferably made from rolled iron or steel of high coefficient of friction and corresponding toughness. It can be made as a forging, pressing or from drawn material. Any desired material affording the requisite braking action can be used as material for the brake surface.

As shown in the drawing, an indicating device or index member q, in the form of a projection, may be provided on the outer side of the holder, to show the extent to which the member b becomes worn away, the distance of the projection from the working face of the strip, or from the well known wheel rim being easily visible. Said projection has thereon, facing the strip b, a flat side or face, as shown, so as to enable a user to determine when new surfacing is required, as by ascertaining the distance from said face to the concave or friction face of the strip.

In all disclosed embodiments of the invention, the brake forces, in whichever direction the wheel rotates, are taken up mainly by the bent back ends of the strip member b and transmitted to the holder, said ends being disposed in the pockets c or engaged with the ends of the holder in embraced relation. The strip devices are thus self supporting on the holder, and it is for preventing dislodgement of the strip, when the brake block is out of the working position, that the retaining means, in the form of the disclosed screws, wedges, or pins, are provided. These devices have therefore no braking forces to withstand. The mounting or replacement of the brake surface on the holder can be effected at any time without protracted interruption of working and during use, as at any stopping place, this being by a ready release of the retaining means which are also easy to reapply.

From the foregoing it will be noted that, in all of the forms described, a certain amount of looseness or play must exist in the fit of the backwardly inclined ends of the shoe so that when brake application is made one end of the shoe will tend to move into the pocket or slot, the end depending on the direction of rotation of the wheel to which the brake is applied. Moreover, by reason of this loose fit, it will be seen that the retaining means is simply to prevent accidental disengagement of the shoe from the head and is not, in any case, subjected to shearing or tensile stresses such as occur where the retaining means is fitted closely to the head and shoe. It will be further noted that in each instance here shown the shoe is a preformed structure. Such brake shoes as are used on railroads necessarily have considerable thickness, it being common for such shoes to have at least one-half inch thickness. Unless these shoes are preformed and capable of application in their preformed condition without any bending or working it is necessary either to subject the shoes to sufficient heat to render them pliable or to subject those parts which have to be formed in order to fit the head to heavy stresses in order to bend the material. In the present instances the shoes may be made of any desired thickness and, being preformed to their ultimate shape, no heating or other forming is required. Thus, with the present invention the preformed shoes can be fitted to the brake heads on the road without trouble and the retaining means is used simply to prevent accidental detachment.

What I claim is:

1. A brake block for wheel peripheries comprising in combination a holding member including a medial concave face and rearwardly directed end face portions, a detachable rigid preformed facing strip having uniform dimensions throughout its length and including rearwardly inclined, offset end portions loosely engaging said holding member, said facing strip bearing throughout its length against said holding member so as to coengage with said holding member during the braking action at least at the medial part and one of the end portions, and detachable means at least at one end portion between the holding member and the strip for loosely engaging the strip and thereby preventing dropping of the strip from the holding member in the non-braking position of the brake block.

2. An external braking device for wheel peripheries including a brake head and a brake shoe, said shoe being a preformed rigid member and having offset end portions, said head being provided with recess means to loosely receive said end portions without deformation of the shoe, and means to loosely confine the end portions in said recess means whereby to prevent dropping of the shoe from said head.

3. An external braking device for wheel peripheries including a brake head and a brake shoe, said shoe being a preformed rigid member of uniform external cross-sectional dimensions throughout and having offset end portions, said head being provided with recess means to loosely receive said end portions without deformation of the shoe, and means to loosely confine the end portions in said recess means whereby to prevent dropping of the shoe from said head.

4. An external braking device for wheel peripheries including a brake head and a brake shoe, said shoe being a preformed rigid member and having offset end portions, said head being provided with forwardly opening pockets to loosely receive said end portions, and means carried by the head and projecting into one of said pockets to loosely confine the adjacent end portion of the shoe and thereby to cause the other end portion to be loosely confined in its pocket whereby to prevent dropping of the shoe from said head while loosely holding the shoe to the head.

5. An external braking device for wheel peripheries including a brake head and a brake shoe, said shoe being a preformed rigid member of uniform external cross-sectional dimensions throughout and having offset end portions, said head being provided with forwardly opening pockets to loosely receive said end portions, and means carried by the head and projecting into one of said pockets to loosely confine the adjacent end portion of the shoe and thereby to cause the other end portion to be loosely confined in its pocket whereby to prevent dropping of the shoe from said head while loosely holding the shoe to the head.

6. An external braking device for wheel peripheries including a brake head and a brake shoe, said shoe being a preformed rigid member and having offset end portions, said head being provided with forwardly opening pockets to loosely receive said end portions, and means carried by the head and projecting into one of said pockets to loosely confine the adjacent end portion of the shoe and thereby to cause the other end portion to be loosely confined in its pocket whereby to prevent dropping of the shoe from said head while loosely holding the shoe to the head, one of said pockets being provided with a lateral inlet opening to permit lateral introduction of the respective shoe end into the pocket.

7. In combination in an external brake, a brake head having a concave face adapted for positioning in concentric relation to the wheel to be braked, a brake shoe of uniform cross-sectional dimensions throughout and having a medial portion curved to conform to the head and further having rearwardly inclined ends, said head and shoe having coacting means restraining the shoe from lateral movement relative to the head, said shoe being arranged for free removal from the head by movement inwardly in a direction substantially radial to the curvature of the shoe face, and means to loosely restrain the shoe from such removal.

ALBERT THODE.